Nov. 24, 1942.   W. C. TRYTHALL   2,303,243
DRILLING AND THE LIKE MACHINE
Filed July 26, 1941   3 Sheets-Sheet 1
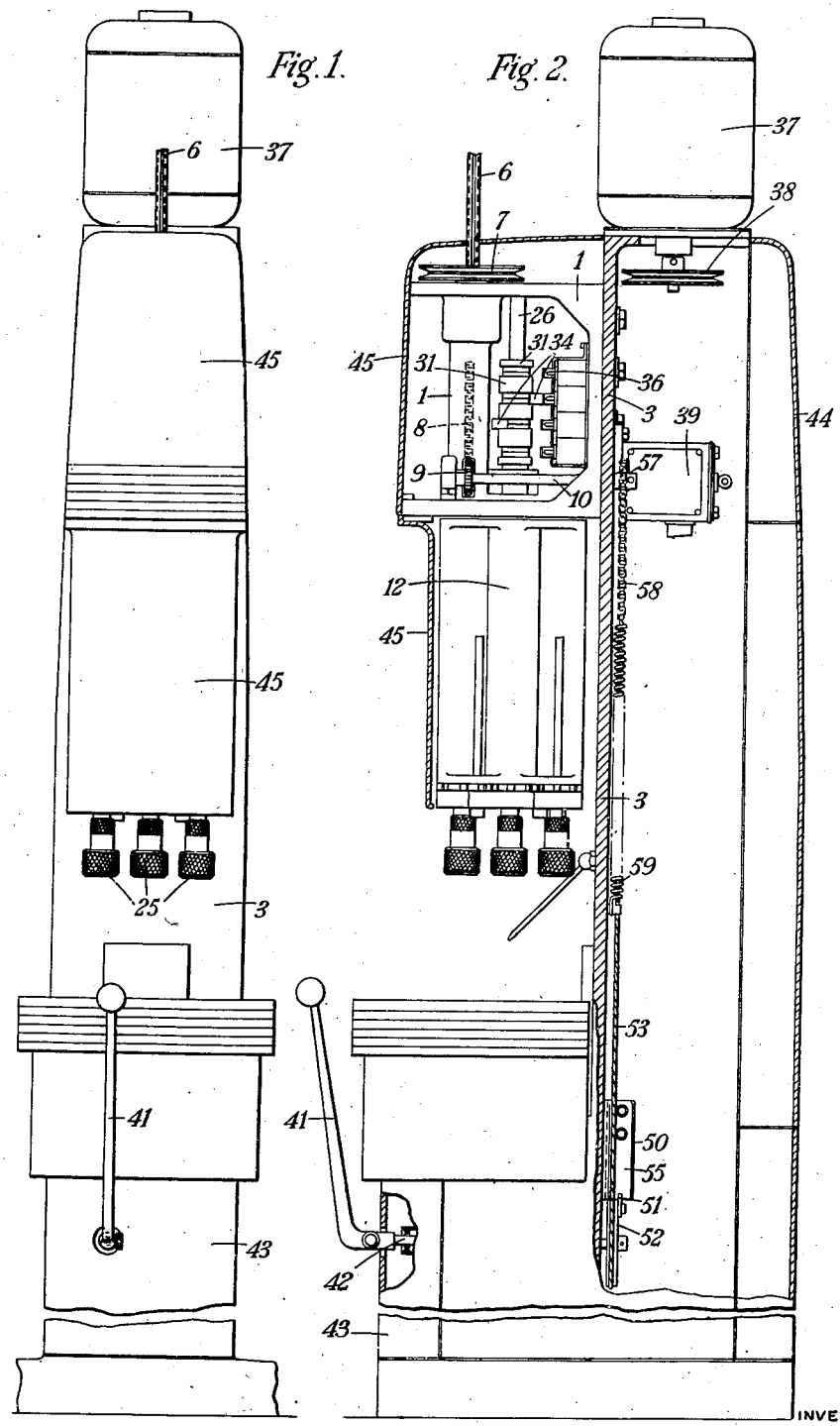
INVENTOR
William Courtney Trythall
BY
Munn, Liddy, Glaccum & Kane
ATTORNEYS

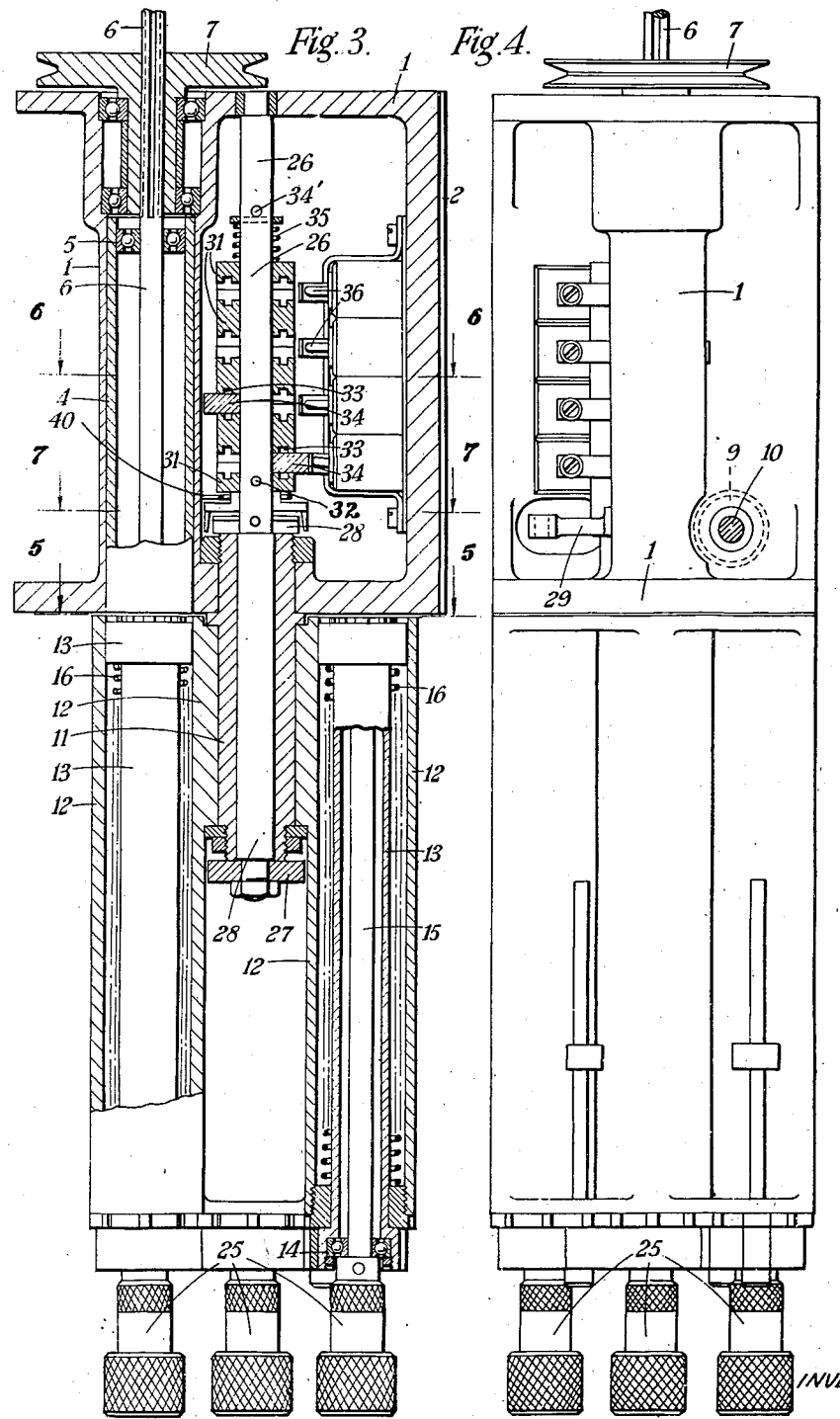

Nov. 24, 1942.  W. C. TRYTHALL  2,303,243
DRILLING AND THE LIKE MACHINE
Filed July 26, 1941  3 Sheets-Sheet 3

INVENTOR
William Courtney Trythall
BY
Munn, Liddy, Glaccum & Kane
ATTORNEYS

Patented Nov. 24, 1942

2,303,243

UNITED STATES PATENT OFFICE 2,303,243

DRILLING AND LIKE MACHINE

William Courtney Trythall, Bedhampton, England

Application July 26, 1941, Serial No. 404,161
In Great Britain August 13, 1940

7 Claims. (Cl. 77—25)

This invention relates to boring, drilling or like machines having revolving tools or cutters (hereinafter referred to as drilling or like machines).

Multiple-spindle drilling machines have previously been used on operations involving the drilling of a multiplicity of holes of the same size at pre-set centres.

It is however often necessary to drill components with a number of holes not necessarily all of the same size or even in the same plane and in such cases, it has heretofore been the practice either to use a single spindle drilling machine, changing the cutting tool, speed and the like after each operation or to use a machine with a battery of spindles (each of which is essentially a single spindle machine) and to transfer the component from one spindle to the next after each operation.

The main object of the present invention is to provide a boring, drilling or like machine in which a number of tool spindles can be brought to an operative position and pre-set so that each will be driven at a selected speed when in that position.

A further object is to provide a preferred form of the improved machine in which a plurality of tool spindles are mounted in a block at equal distances from an axis about which the block is intermittently rotatable. Each spindle is brought by this rotation in succession into driving connection with a driving shaft the speed of which is adjusted, by rotation of the block to any position to a value appropriate to the operation to be carried on by the spindle so brought into operative position. Rotation of the block to each position may for example cause cams to operate speed change devices (for example switches controlling the speed of an electric motor) and these cams may be pre-set according to the desired sequence of speeds.

Other objects and advantages will be appreciated from the description of a specific form of machine (described for convenience as a drilling machine) and of which the new or improved features, combinations and arrangements of parts form in themselves parts of the invention which will now be described in some detail by way of example.

Referring now to the accompanying drawings:

Fig. 1 is a front elevation of a complete machine,

Fig. 2 is a side elevation, partly sectioned, of the same,

Fig. 3 is a sectional side elevation of the drill mechanism,

Fig. 4 is a front elevation of the same,

Figure 5:
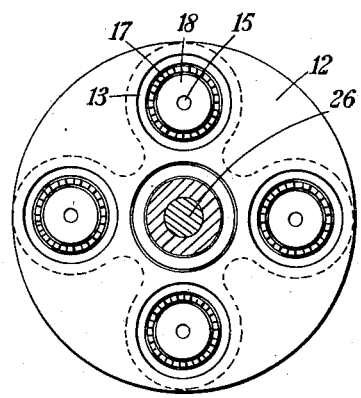
Figure 6:
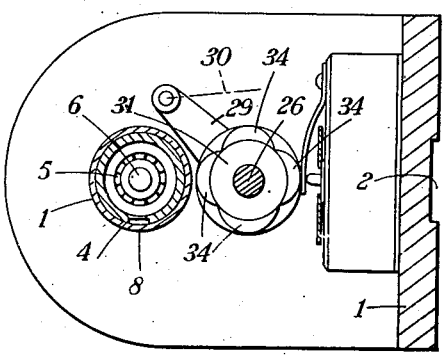
Figure 7:
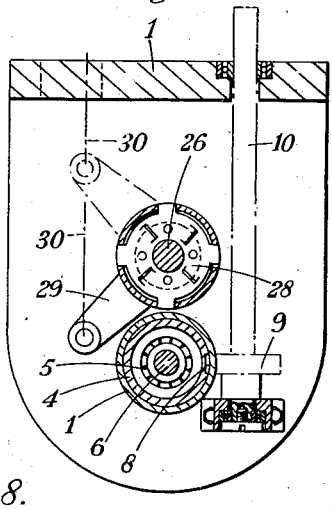
Figure 8:
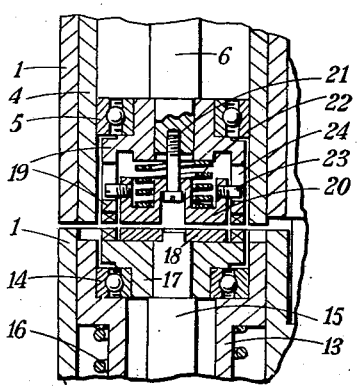
Figure 9:
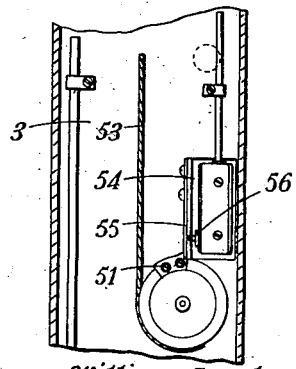

Figs. 5, 6 and 7 are sections on the lines 5—5, 6—6, and 7—7 respectively of Fig. 3, Fig. 8 is a detail in sectional elevation, and Fig. 9 is a fragmentary view of part of Fig. 2 viewed from the back.

The drill mechanism in this form is arranged as a unit which comprises a bracket casting 1 machined on the back face and provided with a locating groove 2 so that it can be bolted in adjusted position on to a corresponding locating face of the frame 3 of a machine of which the unit is to form a part.

This bracket casting is formed with a hollow vertical bore in which a hollow feed sleeve 4 is arranged to slide vertically. Coaxial with this feed sleeve and supported by ball bearings 5 in the sleeve is a driving spindle 6 which is driven by a pulley 7 splined to the driving spindle.

The feed sleeve 4 has a gear rack 8 on one side engaging with a feed gear wheel 9 on a horizontal feed shaft 10 which is rotatable to raise and lower the feed sleeve and the driving spindle.

From the under surface of the bracket casting, swivelling on a rigid hollow shaft 11 is a rotating quill block 12 bored for four (or any other desired number) self contained quill units. Each of the four bores contains a quill sleeve 13 housing ball bearings 14 supporting a chuck spindle 15. Each of these sleeves is of two diameters so that a coil spring 16 can be accommodated between it and the bore of the quill block 12. The spring 16 holds the whole quill assembly at the top except during actual operation and feeding. On the top of each chuck spindle 15 is one member of a friction and dog clutch adapted to be engaged by a co-operating clutch member on the lower end of the driving spindle. These parts are shown in Fig. 8, the upper end of the chuck spindle 15 having mounted upon it a dog clutch member 17 and friction pad 18; and the lower end of the driving spindle 6, a dog clutch member 19 and pad 20. The pad 20 is pressed down to the limit allowed by the securing screw 21 by a stiff spring 22 and is held from rotation by the pins and slots 23, 24. The setting is such that the friction pads bring the chuck spindle more or less to synchronism with the driving spindle before the dogs engage. Before any drilling thrust takes place the feed sleeve 4 abuts the top of the quill sleeve 13, the dogs being by then properly engaged. On the lower end of the chuck spindle is the chuck or tool holder 25.

Rotation of the quill block brings the chuck spindles successively in line with the driving spindle and (as just seen) when this is lowered by the feed shaft 10, the clutch members engage and the chuck spindle is rotated and fed downwardly with the driving spindle. It will be noted that the feed sleeve locates the quill block as it enters the bore of the quill block.

Running through the hollow shaft 11 of the quill block is a camshaft 26 suitably mounted and secured as indicated. This shaft 26 serves first, to turn the quill block between each operation by means of a dog plate 27 and secondly to swing cams into and out of contact with speed controlling switches. Cams can also be mounted on this camshaft to control auxiliary functions and electrical movements.

Where the camshaft comes through the top of the hollow shaft there is situated a ratchet mechanism 28 and lever 29. The ratchet engages the lever at 90 deg. intervals in the specific form having four chuck spindles. The ratchet mechanism can be operated (for example, through a pull rod indicated at 30 by its centre line) automatically by any conventional means, for example electrical means such as a solenoid (as will be described later) or torque motor or by air or hydraulic cylinder. The choice of this control would depend largely on how other functions of the complete machine were operated.

The cam block comprises a series of moulded cam holders 31 with recesses at 90 deg. These holders slide free on the cam shaft (except the lower one which is pinned at 32) and have recesses in their upper and lower faces so that locating pegs 33 modulated as part of the cam pieces 34 can fix each holder at a definite 90 deg. to the one adjacent to it. The cam pieces are slipped into position between each pair of holders. The whole assembly is held down tightly by a top pin 34' and a spring 35 (Fig. 2) pressing on the top of the cam assembly. As these cams swing around they engage with the buttons 36 of snap action switches and close the motor circuit giving the required speed, for example by changing the poles of a motor 37 driving the pulley 7 on the driving spindle.

To change the speed sequence to suit a new tool set-up, it is only necessary to remove the top pin, allowing the holder mouldings to slide up the shaft and be free of one another. The cam pieces are then slipped into the appropriate recess—beginning at the bottom—and the block locked again by the insertion of the pin. It will be appreciated that in four very similar operations all four cam pieces may operate on the same switch. On the other hand each operation may call for a different speed of the four available.

This complete unit as shown in Figs. 3 to 8 is assembled as shown in Figs. 1 and 2 in a drilling machine, the frame of which may be a large casting or a welded steel plate assembly. As shown in Figs. 1 and 2 the four speed change pole motor 37 is mounted on horizontal slides on the top of the U sectioned frame casting 3 and a suitable horizontal screw adjustment of conventional form and not shown may be provided for the tension of a V belt transmitting the drive from the motor pulley 38 to the pulley 7.

The rotary quill block 12 may be operated by the pull of a solenoid unit of well-known type indicated at 39. This has an air dashpot incorporated to dampen the sudden action of the sole-noid somewhat. A hairpin form of spring 40 around the ratchet housing and bearing on the tubular portion of the bracket casting 1, will return the ratchet mechanism and solenoid in readiness for the next operation. As mentioned earlier this function might equally well be carried out by a torque motor or by air or hydraulic means.

The solenoid unit is controlled by a switch 50 (Figs. 2 and 9) mounted lower down in the frame. This switch is in turn tripped by an adjustable dog 51 on a wheel 52 which accommodates the feed cable 53. The dog is set so that a 5 or 6 degree movement of the operating lever 41 to the left as indicated in Fig. 1 from the "at rest" position, against the pressure of a spring blade 55, operates the switch. The switch is mounted on an angle bracket 54 on the outer face of which is placed the spring blade 55. The plunger 56 of the switch protrudes through a hole in the flange of the angle bracket and is adjusted so that no matter how much pressure is placed on the operating lever 41 the strain is not transmitted through the switch plunger to the switch mechanism, but is taken through the compressed spring blade 55 to the angle bracket as indicated in Fig. 9.

As described previously the feed is carried out by the gear wheel 9 operating on the rack 8 cut or fastened to the feed sleeve. The feed shaft 10 in the arrangement described projects through the back of the bracket 1 and through the centre web of the main machine frame 3. On the end is a chain sprocket 57. A chain 58 runs over this sprocket and has a tension spring 59 at one end and the cable 53 at the other. The spring 59 is anchored to the frame 3. The cable 53 is secured to the wheel 52 on the inside end of the shaft 42 of the operating lever. After the action of feed-in the spring returns the whole mechanism right back to the drive spindle, to the "at rest" position.

The operating lever shaft 42 may be housed in ball bearings and lies horizontally. On the outside end at the front of the machine the operating lever is so set as to be approximately vertical in the "at rest" position. The operating lever is quickly detachable from the shaft in order that the front lower cover 43 can be removed and access gained to the inside.

Any convenient or conventional means may be used to adjust the relative height of work table and drill mechanism.

Rear covers 44 are provided which may be conveniently accommodated on the switch gear brackets. The mechanism at the front is shielded by covers 45.

The operation of the machine will now be clear. The cams are set up so as to control the motor speed in accordance with the particular operation to be carried out by each spindle. The first operation is carried out on the workpiece by feeding the appropriate chuck spindle downwardly by moving the operating lever. The operating lever is then returned and moved slightly in the opposite direction thereby operating the solenoid switch and causing the quill block to be rotated to bring the drill appropriate to the second operation into position. At the same time, the speed control switches are operated to adapt the speed of the motor to this second operation.

It will be understood that the invention is not restricted to the details of the specific machine described but includes such modifications as come within the broad ideas underlying them and the scope of the claims.

I claim:

1. A drilling or like machine having a plurality of tool spindles, means to bring any one of the said spindles to an operative position, means to drive a spindle when in the operative position at any one of a number of alternative speeds and means operating automatically when a spindle is brought to the operative position to select the driving speed predetermined for that spindle.

2. A drilling or like machine having a plurality of tool spindles, a driving shaft, a carrier adapted to carry the said spindles in succession into operative position to be driven by the said driving shaft, means to drive the said driving shaft at any predetermined one of a number of alternative speeds, and pre-setting means arranged automatically to select the speed predetermined for each spindle when that spindle is carried into operative position.

3. A drilling or like machine having a plurality of tool spindles, a driving shaft, a rotatable block adapted to carry the said spindles in succession into operative position to be driven by the said driving shaft, means to drive the said driving shaft at any predetermined one of a number of alternative speeds, and pre-setting devices arranged automatically to select the speed predetermined for each spindle when that spindle is carried into operative position.

4. A drilling or like machine having a plurality of tool spindles, a driving member, a carrier adapted to carry the said spindles successively into operative position to be driven by the said driving member, means to drive the driving member at any one of a number of alternative speeds, electrical means predetermining the speed available at any time, and selector means movable with said carrier and presettable to actuate the said electrical means to make available the particular speed selected for each spindle.

5. A drilling or like machine having a plurality of tool spindles, a driving member, a carrier adapted to carry the said spindles successively into operative position to be driven by the said driving member, multispeed change pole driving means to drive the driving member, electrical change speed means, and selector means movable with said carrier and presettable to actuate the said electrical means to make available the particular speed selected for each spindle.

6. A drilling or like machine having a plurality of tool spindles, carrying means arranged to carry the spindles successively into opeartive position, means to drive a spindle for the time being in operative position, change speed means affecting the driving means, and tool feeding means, together with an operating member arranged when moved to one side of an intermediate position to actuate the tool feeding means and on the other side of the said position to actuate the carrying means and the change speed means.

7. A drilling or like machine having a plurality of tool spindles, rotatable means arranged to carry the spindles successively into operative position, means to drive a spindle for the time being in operative position, change speed means affecting the driving means, and tool feeding means, together with an operating member arranged when moved to one side of an intermediate position to actuate the tool feeding means and on the other side of the said position to actuate the rotatable means and the change speed means.

WILLIAM COURTNEY TRYTHALL.